(12) United States Patent
Hannington et al.

(10) Patent No.: US 7,344,618 B2
(45) Date of Patent: Mar. 18, 2008

(54) ADHESIVE ARTICLES WITH IMPROVED AIR EGRESS AND METHODS OF MAKING THE SAME

(75) Inventors: Michael Hannington, Madison, OH (US); Pradeep Iyer, Hacienda, CA (US)

(73) Assignee: Avery Dennison Corporation, Pasadena, CA (US)

( * ) Notice: Subject to any disclaimer, the term of this patent is extended or adjusted under 35 U.S.C. 154(b) by 349 days.

(21) Appl. No.: 10/953,998

(22) Filed: Sep. 29, 2004

(65) Prior Publication Data

US 2005/0039847 A1 Feb. 24, 2005

Related U.S. Application Data

(62) Division of application No. 09/742,653, filed on Dec. 21, 2000, now abandoned.

(60) Provisional application No. 60/199,244, filed on Apr. 24, 2000.

(51) Int. Cl.
*B32B 37/00* (2006.01)

(52) U.S. Cl. ............... 156/277; 156/87; 156/290; 428/201; 428/202

(58) Field of Classification Search ........... 156/87, 156/277, 290; 428/201, 202
See application file for complete search history.

(56) References Cited

U.S. PATENT DOCUMENTS

| | | | |
|---|---|---|---|
| 2,191,704 A | 2/1940 | Bennett | 91/68 |
| 3,301,741 A | 1/1967 | Henrickson et al. | 161/119 |
| 3,331,729 A | 7/1967 | Danielson et al. | 161/162 |
| 3,413,168 A | 11/1968 | Danielson et al. | 156/71 |
| 3,554,835 A | 1/1971 | Morgan | 156/234 |
| 3,565,750 A * | 2/1971 | Evans | 428/41.4 |
| 4,289,821 A | 9/1981 | Gray, III et al. | 428/172 |

(Continued)

FOREIGN PATENT DOCUMENTS

DE 3417746 11/1985

(Continued)

OTHER PUBLICATIONS

Abstract for JP 05084825, 1993.*

(Continued)

*Primary Examiner*—John L Goff
(74) *Attorney, Agent, or Firm*—Renner, Otto, Boisselle & Sklar, LLP

(57) ABSTRACT

This invention relates to an adhesive article which provides air egress. Air egress is provided by supplying a route, such as areas of no initial adhesion for the air to flow out from under the construction. The invention relates to an adhesive article comprising a facestock having a front surface and a back surface, a continuous layer of adhesive having an upper surface and a lower surface wherein the upper surface of the adhesive layer is adhered to the back surface of the facestock, and a plurality of spaced-apart non-adhesive material which is in contact with the lower surface of the adhesive layer wherein the lower surface of the adhesive layer has a Sheffield roughness of at least about 10 and the adhesive article provides air egress. The invention also relates to methods of preparing the adhesive articles. These articles have usefulness as industrial graphics images, as well as decorative coverings, etc. The articles provide air egress and optionally repositionability and slideability.

45 Claims, 6 Drawing Sheets

U.S. PATENT DOCUMENTS

| | | | | |
|---|---|---|---|---|
| 4,306,928 | A | * | 12/1981 | Okui .................... 156/267 |
| 4,322,450 | A | | 3/1982 | Gray, III et al. ............ 427/44 |
| 4,397,905 | A | | 8/1983 | Dettmer et al. ........... 428/180 |
| 4,425,176 | A | * | 1/1984 | Shibano et al. ........ 156/244.11 |
| 4,427,732 | A | | 1/1984 | Gray, III et al. .......... 428/172 |
| 4,556,595 | A | | 12/1985 | Ochi .................... 428/143 |
| 4,576,597 | A | * | 3/1986 | Hlaban .................. 604/390 |
| 4,582,534 | A | | 4/1986 | Torobin .................. 75/229 |
| 4,713,273 | A | | 12/1987 | Freedman ................ 428/40 |
| 4,721,638 | A | | 1/1988 | Matsuguchi et al. ......... 428/40 |
| 4,761,320 | A | | 8/1988 | Coburn, Jr. .............. 428/167 |
| 4,771,891 | A | | 9/1988 | Sorensen et al. .......... 206/459 |
| 4,889,234 | A | | 12/1989 | Sorensen et al. .......... 206/459 |
| 4,971,854 | A | | 11/1990 | Hinishi et al. ............ 428/195 |
| 5,008,139 | A | * | 4/1991 | Ochi et al. .............. 428/40.2 |
| 5,141,790 | A | | 8/1992 | Calhoun et al. ............ 428/40 |
| 5,180,635 | A | | 1/1993 | Plamthottam et al. ...... 428/345 |
| 5,194,299 | A | | 3/1993 | Fry ..................... 427/194 |
| 5,268,228 | A | | 12/1993 | Orr ..................... 428/343 |
| 5,273,805 | A | | 12/1993 | Calhoun et al. ........... 428/156 |
| 5,296,277 | A | | 3/1994 | Wilson et al. ............. 428/40 |
| 5,344,681 | A | | 9/1994 | Calhoun et al. ............ 428/42 |
| 5,344,693 | A | | 9/1994 | Sanders ................. 428/167 |
| 5,362,516 | A | | 11/1994 | Wilson et al. ........... 427/207.1 |
| 5,449,540 | A | | 9/1995 | Calhoun et al. ............ 428/42 |
| 5,462,765 | A | | 10/1995 | Calhoun et al. ........... 427/199 |
| 5,487,929 | A | | 1/1996 | Rusincovitch, Jr. et al. ... 428/40 |
| 5,585,178 | A | | 12/1996 | Calhoun et al. ........... 428/343 |
| 5,589,246 | A | | 12/1996 | Calhoun et al. ........... 428/120 |
| 5,591,290 | A | | 1/1997 | Walter et al. ............. 156/152 |
| 5,650,215 | A | | 7/1997 | Mazurek et al. ........... 428/156 |
| 5,676,787 | A | | 10/1997 | Rusincovitch et al. ...... 156/277 |
| 5,731,073 | A | | 3/1998 | Knott et al. ............ 428/304.4 |
| 5,795,636 | A | | 8/1998 | Keller et al. ............ 428/40.1 |
| 5,853,862 | A | | 12/1998 | Murai et al. .............. 428/215 |
| 5,866,220 | A | | 2/1999 | Rusincovitch et al. ..... 428/40.1 |
| 5,897,930 | A | | 4/1999 | Calhoun et al. ........... 428/41.8 |
| 5,906,883 | A | | 5/1999 | Blanc-Brude ............. 428/178 |
| 5,915,731 | A | * | 6/1999 | Jackson ................... 283/91 |
| 6,001,471 | A | | 12/1999 | Bries et al. ............... 428/343 |
| 6,024,824 | A | * | 2/2000 | Krech .................... 156/279 |
| 6,083,616 | A | | 7/2000 | Dressler ................. 428/323 |
| 6,123,890 | A | | 9/2000 | Mazurek et al. | |
| 6,197,397 | B1 | | 3/2001 | Sher et al. ............... 428/42.3 |
| 6,372,341 | B1 | * | 4/2002 | Jung et al. ............... 428/354 |
| 6,524,675 | B1 | * | 2/2003 | Mikami et al. ........... 428/40.1 |

FOREIGN PATENT DOCUMENTS

| | | | |
|---|---|---|---|
| EP | 0 279 579 | A1 | 8/1988 |
| EP | 0 429 269 | A1 | 11/1990 |
| EP | 0 479 223 | B1 | 1/1996 |
| EP | 0 491 099 | B1 | 8/1996 |
| EP | 0 611 055 | B1 | 9/1997 |
| GB | 1 511 060 | | 5/1978 |
| GB | 1 541 311 | | 2/1979 |
| JP | 53149259 | | 12/1978 |
| JP | 5953787 | | 3/1984 |
| JP | 5978285 | | 5/1984 |
| JP | 061254334 | | 11/1986 |
| JP | 03231981 | | 10/1991 |
| JP | 05084825 | A * | 4/1993 |
| JP | 5271629 | | 5/1993 |
| JP | 06212131 | | 8/1994 |
| JP | 09157612 | | 6/1997 |
| WO | 98/29516 | | 7/1998 |
| WO | 99/15600 | | 4/1999 |
| WO | 99/35201 | | 7/1999 |
| WO | 00/69985 | | 11/2000 |

OTHER PUBLICATIONS

Machine translation for JP 05084825, 2007.*
PCT/US01/12958; International Search Report mailed Sep. 4, 2001.
PCT/US01/12999; International Search Report mailed Jul. 31, 2001.
European Search Report mailed Sep. 11, 2006 for Patent Application No. 06012188.6-2102.

* cited by examiner

ADHESIVE ARTICLES WITH IMPROVED AIR EGRESS AND METHODS OF MAKING THE SAME

This application claims the priority of U.S. Provisional Application No. 60/199,244 filed Apr. 24, 2000. This application is a divisional of U.S. application Ser. No. 09/742,653, filed Dec. 21, 2000, now abandoned. These applications are incorporated by reference herein in their entirety.

TECHNICAL FIELD OF THE INVENTION

This invention relates to adhesive articles and methods of making the same. The adhesive articles may be used for graphic images, such as those used on vehicles.

BACKGROUND OF THE INVENTION

Pressure sensitive adhesives have enjoyed great acceptance for their convenience of use. The pressure sensitive adhesive is often used for tapes and articles containing graphic images. The advantages of the pressure sensitive adhesives are their strong bonding and simplicity of application. One drawback of these products is the initial tenacity of the pressure sensitive adhesive. The positioning of the product must be precise because of the initial strong bond of the adhesive. A need exists to make products using pressure sensitive adhesives which are repositionable, i.e. the product may be removed after light application of pressure without destroying the product or the substrate. Another need exists for the products to be able to slide. Slideability allows for correction of alignment of the product without the need of completely removing the product and possibly destroying the adhesive article or substrate.

When the product is a graphic image and is applied over an area like a wall or truck panel, there is the possibility of trapping air under the product and forming bubbles or wrinkles. The product must exhibit air egress, i.e. the ability of the product to provide a route for air trapped under the product to be removed.

A need exists for products which have one or more of the desirable properties of air egress, repositionability and slideability.

SUMMARY OF THE INVENTION

This invention relates to an adhesive article which provides air egress. Air egress is provided by supplying at least one route, such as areas of no initial adhesion for the air to flow out from under the construction. The invention relates to an adhesive article comprising a facestock having a front surface and a back surface, a continuous layer of adhesive having an upper surface and a lower surface, wherein the upper surface of the adhesive layer is adhered to the back surface of the facestock, and a pattern of non-adhesive material forms that are in contact with the lower surface of the adhesive layer, wherein the adhesive article provides air egress. The invention further relates to methods of preparing the adhesive articles. These articles have usefulness as industrial graphics images, as well as decorative coverings, etc. The articles provide one or more of air egress, repositionability and slideability.

The method of making the adhesive articles of the present invention includes the steps of: (a) applying a pattern of a non-adhesive material onto the release layer of a release liner; (b) embedding the non-adhesive material into the release liner; (c) coating a pressure sensitive adhesive onto the release layer of the release liner; and then (d) applying a facestock or second release liner to the adhesive layer.

Another embodiment of the method of making the adhesive articles of the present invention includes the steps of: (a) applying a pattern of a non-adhesive material onto one or both sides of a release liner that has a release coating on both sides with the release of one side being higher than the other; (b) embedding the non-adhesive material into one or both sides of the release liner; (c) coating a pressure sensitive adhesive onto both sides of the release liner; and (d) applying a facestock having a front and back surface to the first adhesive layer, with the front surface of the facestock adhered to the outer surface of the first adhesive layer, and winding the material so that the outer surface of the second adhesive layer is in adhesive contact with the back surface of the facestock. The embedding and applying steps may be combined. This embodiment is commonly known as a double faced adhesive tape.

DESCRIPTION OF THE PREFERRED EMBODIMENTS

Figure 1A:
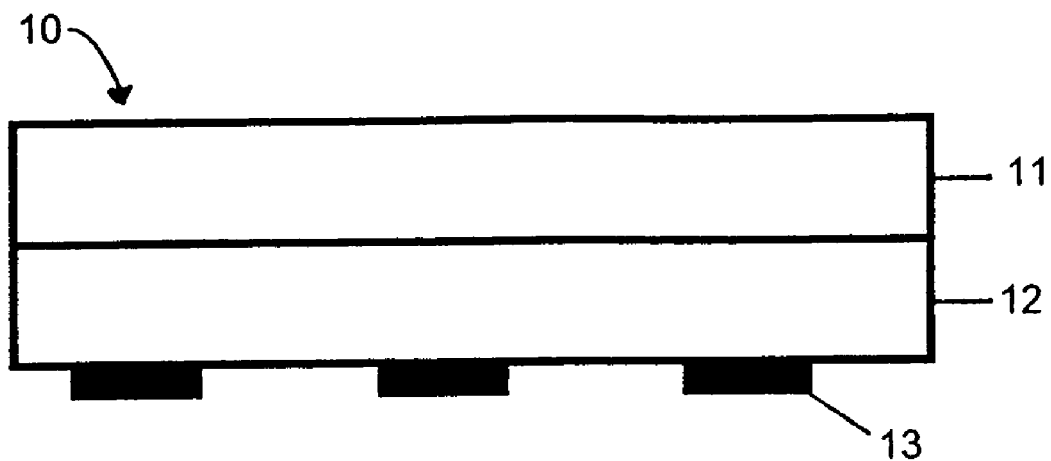
FIGS. 1a and 1b are cross sectional views of an adhesive article with non-adhesive material on the surface of the adhesive.

As described above, the present invention relates to adhesive articles such as those used for industrial graphics. The adhesive articles provide one or more of air egress, repositionability and slideability for easy application to a substrate.

The adhesive articles comprise a facestock, a continuous adhesive layer, and a non-adhesive material. The adhesive article may further comprise a release liner releasably adhered to the adhesive layer. In one embodiment, the non-adhesive material includes non-adhesive polymers, including ink compositions applied by printing methods. In another embodiment, the non-adhesive material is applied by vacuum metalization or by sputtering. The non-adhesive material, after drying, cooling, and/or curing, releasably adheres to the upper surface of the release liner. In one embodiment, the non-adhesive composition contains greater than 50%, or greater than 75%, or greater than 85% solids. In another embodiment, the non-adhesive composition is 100% solids.

In one embodiment, the non-adhesive material can be any material that can be used as the ink on a printing machine, provided that upon drying, cooling, and/or curing, the non-adhesive material is not tacky. The non-adhesive material may be made of organic polymeric material such as polyurethane, polyvinyl chloride, acrylic polymers, acetate, polyethylene, polypropylene or polystyrene and the like.

In one embodiment, the non-adhesive composition is a UV curable ink. The ultraviolet radiation curable inks useful in the invention generally comprise a binder which comprises one or more photopolymerizable monomers. The photopolymerizable monomers generally are ethylenically unsaturated compounds. The unsaturated compounds may contain one or more olefinic double bonds, and they may be low molecular weight compounds, (monomeric) or high molecular weight compounds (oligomeric). Illustrative examples of monomers containing one double bond are acrylates such as alkyl(meth)acrylates or hydroxyalkyl (meth)acrylates such as methyl-, ethyl-, butyl-, 2-ethylhexyl- or 2-hydroxyethylacrylate, isobornylacrylate, methyl- or ethylmethacrylate. Further examples of photopolymerizable monomers are acrylonitrile, acrylamide, methacrylamide, N-substituted (meth) acrylamides, vinyl esters such as vinyl acetate, vinyl ethers such as isobutylvinyl ether, styrene, alkylstyrenes and halostyrenes, N-vinylpyrrolidone, vinyl chloride or vinylidene chloride.

Monomers containing a plurality of double bonds are typically the diacrylates of ethylene glycol, 1,3-propylene glycol, 1,4-butaneodiol, 1,4-cyclohexane diol, neopentyl glycol, hexamethylene glycol, or bisphenol A polyacrylates such as trimethylolpropane triacrylate and pentaerythritol triacrylate or tetraacrylate, vinyl acrylate, divinyl benzene, divinyl succinate, diallyl phthalate, triallylphosphate, triallylisocyanurate or tris(2-acryloyloxy)ethyl-isocyanurate.

Typical examples of high molecular weight (oligomeric) polyunsaturated compounds are acrylated epoxy resins, acrylated polyethers, acrylated polyurethanes or acrylated polyesters. Further examples of unsaturated oligomers are unsaturated polyester resins which are normally prepared from maleic acid, phthalic acid and one or more diols and which have molecular weights of about 500 to about 3000. Such unsaturated oligomers may also be referred to as prepolymers. Single component systems based on photocurable prepolymers are often used as binders for printing inks. Unsaturated polyester resins are normally used in two-component systems together with a monounsaturated monomer such as described above, preferably with styrene.

The unsaturated compounds also can be used in admixture with non-photopolymerisable film-forming components. These components may typically be drying polymers or their solutions in organic solvents, such as nitrocellulose. They may also, however, be chemically curable or thermocurable resins such as polyisocyanates, polyepoxides or melamine resins. The concomitant use of thermocurable resins is important for use in so-called hybrid systems which are photopolymerised in a first step and crosslinked by a thermal after treatment in a second step.

The UV radiation curable inks also should contain at least one photoinitiator. A wide range of different photoinitiators is at present available for UV radiation curable systems. They include benzophenone and benzophenone derivatives, benzoin ethers, benzil ketals, dialkoxyacetophenones, hydroxyacetophenones, aminoacetophenones, haloacetophenones or acryloxyphosphine oxides. They differ in that they have different absorption maxima. To cover a wide absorption range it is possible to use a mixture of two or more photoinitiators. The total amount of photoinitiator in the UV radiation curable compositions may be in the range of from about 0.05 to about 7, or 10% by weight of the total composition. Preferably the compositions contain from about 0.2% to about 5% by weight of the photoinitiator.

Amines may be added to accelerate the photopolymerisation, for example triethanolamine, N-methyl-diethanolamine, p-dimethylaminobenzoate or Michler's ketone. The photopolymerisation can further be accelerated by the addition of photosensitisers which displace or broaden the spectral sensitivity. These photosensitisers are preferably aromatic carbonyl compounds such as thioxanthone, anthraquinone and 3-acyl-coumarin derivatives as well as 3-(aroylmethylene)-thiazolines.

Hindered amine light stabilizers (HALS) which function as co-stabilizers, also may be added to the UV radiation curable printing compositions used in the present invention. Examples of hindered amine light stabilizers include those listed and recited in U.S. Pat. Nos. 5,112,890 and 4,636,408, which are incorporated herein by reference. A specific example of a hinder amine light stabilizer useful in the printing inks is Tinuvin 292 which is identified as bis(1,2, 2,6,6-pentamethyl-4-piperidinyl) sebacate.

In addition to the above described binder materials and photoinitiators, the UV radiation curable inks used in the present invention may also contain coloring matter selected from organic pigments, inorganic pigments, body pigments and dyes which are known and have been used in this art. Examples of useful pigments include titanium dioxide, cadmium yellow, cadmium red, cadmium maroon, black iron oxide, carbon black, chrome green, gold, silver, aluminum and copper. Examples of dyes include alizarine red, Prussian blue, auramin naphthol, malachite green, etc. Generally the concentration of the pigment or dye in the ink will be from about 0 to about 70% by weight, and in one embodiment, from about 0.1% to about 50% by weight.

In addition to the above described coloring matter, the UV radiation curable inks used in the present invention may also contain fillers, extenders, surfactants, and the like which are known and have been used in this art. Examples of useful fillers and extenders include silicon dioxide, fumed silica, glass or ceramic microspheres, and glass or ceramic bubbles. Generally the concentration of the filler or extender will be from about 0 to about 70% by weight, and in one embodiment, from about 0.5% to about 50% by weight.

The printing inks may also contain at least one UV absorber which provides weathering protection and helps prevent microcracking. The amount of UV absorber included in the UV radiation curable ink should be maintained at a practical minimum since the presence of the UV absorber may increase the curing rate. A variety of UV absorbers are known and useful in the present invention and these include UV absorbers belonging to the group of photopolymerisable hydroxybenzophenones and photopolymerisable benzotriazoles. U.S. Pat. No. 5,369,140 describes a class of 2-hydroxyphenyl-s-triazines that are useful as UV absorbers for radiation curable systems. The triazines are effective for stabilizing cured films when exposed to sunlight over a long period of time, and these stabilizers do not interfere with UV radiation curing of the inks. The triazine UV absorbers are effective in amounts of from about 0.1 to about 2% by weight. The UV absorbers may be used in combination with other light stabilizers such as sterically hindered amines. The disclosure of the '140 patent is hereby incorporated by reference for its disclosure of such UV absorber combinations. U.S. Pat. Nos. 5,559,163 and 5,162, 390 also describe UV absorbers which are useful in the inks of the present invention.

Examples of useful UV curable inks include those available from Decochem under the trade designation Poly-Rad plastics, as well as UV curable inks commercially available from Acheson and Daw Chemical Company.

In one embodiment of the invention, the ink used to form the non-adhesive material on the release liner is a coalescing ink. The ink does not efficiently wet out on the surface of the release liner, but coalesces into smaller areas of ink with an increase in height. Thus, depending on the degree of coalescence, a line of printed ink can form a narrower line, or a line made up of what appear to be random small beads of ink, or a combination, all with an increase in height. The narrower line, small beads, or combination are then embedded into the liner. The thickness of the ink applied to the surface of the release liner can also affect the degree of coalescence. Surfactants may be added to the ink composition to control the degree of coalescence as well.

In one embodiment of the invention, the ink used to form the non-adhesive material comprises a porous non-adhesive. The porous non-adhesive may have elastomeric properties, so that if it is compressed, it essentially returns to its original shape. For example the porous non-adhesive comprises an ink containing a blowing agent that causes the ink to expand, forming an open or closed cell, or combination thereof. The blowing agent is activated, for example, by the application of heat to the ink. Other examples of porous non-adhesives include suspensions of gas and/or particles in a binder. The porous non-adhesive is then embedded into the release liner. The porous non-adhesive fills the depression created in the embedding step, resulting in a facestock layer having a smooth outer appearance.

The non-adhesive material is generally present in a pattern. The pattern can be a plurality of dots, lines, or any geometric figure, that provides a path for air egress from the adhesive article. When lines are used, at least about 50% of the pattern should extend to the edge of the adhesive article to obtain acceptable air egress. The lines and dots may vary in size provided that air egress is maintained. The lines and other patterns generally have an average thickness from about 0.3μ to about 100μ, or from about 0.5μ to about 50μ, or from about 2μ to about 20μ. The width of the lines may also vary widely. An example of a useful range for line width is from about 12μ to about 250μ, or from about 25μ to about 125μ, or from about 50μ to about 75μ. The pattern may be a grid of intersecting lines, a weave pattern, a waffle pattern, diagonal straight and curved lines, tiled geometric figures, such as hexagons, rectangles, overlapping circles or triangles, or lines in a cross hatch pattern. Combinations of patterns may be used such as a grid of intersecting lines with random or patterned dots. The non-adhesive material may be applied by any means.

In one embodiment, the non-adhesive material is an ink comprising a UV curable polymer composition, such as a UV curable acrylic or polyurethane composition. After application, the ink is cured by irradiation in a UV exposure apparatus as is well known to those skilled in the art of printing and UV curing. UV light sources such as low pressure mercury lamps, high pressure mercury lamps, xenon lamps, arc lamps and gallium lamps are useful. It is also possible, but not necessary, to improve the curability of the ink by heating after irradiation.

In one embodiment, the non-adhesive material is a polymer composition which is able to be printed by any suitable printing technique such as screen printing, roller coat printing, flexographic printing, lithographic printing, gravure printing, laser printing, ink jet printing, brushing, spraying, dipping or coating. The type of printing may be any type which can print on the release liner. One particularly useful printing method is a modification of flexographic printing which provides both the printing and embedding of the non-adhesive material.

In one embodiment, the non-adhesive layer is a printing ink having a thickness from about 0.3 to about 100 microns, from about 0.5 to about 50 microns, or from about 2 to about 20 microns. The non-adhesive material may also be applied to the release liner by means of patterned vacuum metallization or sputtering. In this embodiment, the non-adhesive layer typically has a thickness from about 30 to about 3000, from about 100 to about 2000, or from about 300 to about 1500 nanometers.

As described above, the adhesive article has a facestock, an adhesive layer, a plurality of non-adhesive material and optionally the construction has a release liner. The facestock may be applied to the adhesive layer which has already been releasably adhered to a release liner. Alternatively, the facestock and adhesive layer together may be applied to the release liner. The facestock may be any of those which are useful for decorative or graphic image applications. The facestocks typically have a thickness from about 10 to about 300, or from about 25 to about 125 microns. The facestocks include paper, polyolefins (linear or branched), polyamides, polystyrenes, nylon, polyesters, polyester copolymers, polyurethanes, polysulfones, polyvinylchloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Included in this group are acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of alpha-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyethylenes that are useful have various densities including low, medium and high density ranges. The low density range is from about 0.910 to about 0.925 g/cm$^3$; the medium density range is from about 0.925 to about 0.940 g/cm$^3$; and the high density range is from about 0.94 to about 0.965 g/cm$^3$. Films prepared from blends of copolymers or blends of copolymers with homopolymers also are useful. The films may be extruded as a monolayer film or a multi-layered film.

In one embodiment, the first facestock is a polymeric facestock, which contains migratory additives. The facestocks are preferably polyvinylchloride facestocks. The additives include plasticizers and antioxidants. The plasticizer is a high-boiling solvent or softening agent, usually liquid. It is an ester made from an anhydride or acid and a suitable alcohol that usually has between 6 to 13 carbon atoms. The plasticizers may be adipate, phosphate, benzoate or phthalate esters, polyalkylene oxides, sulfonamides, etc. The plasticizers include but are not limited to DOA plasticizer (dioctyl adipate), TEGEH plasticizer (triethylene glycol di-2-ethylhexanoate), TOTM plasticizer (trioctyl trimellitate), triacetin plasticizer (glyceryl triacetate), TXIB plasticizer (2,2,4-trimethyl-1,3-pentanediol diisobutyrate), DEP plasticizer (diethyl phthalate), DOTP plasticizer (dioctyl terephthalate), DMP plasticizer (dimethyl phthalate), DOP plasticizer (dioctyl phthalate), DBP plasticizer (dibutyl phthalate), polyethylene oxide, toluenesulfonamide, dipropylene glycol benzoate, and the like.

The adhesive articles have a continuous adhesive layer, typically a pressure sensitive adhesive layer. In some applications, the adhesive may be a heat activated adhesive, as distinguished from a pressure sensitive adhesive. The adhesive layer typically has a thickness from about 10 to about 125, or from about 25 to about 75, or from about 10 to about 50 microns. In one embodiment, the coat weight of the pressure sensitive adhesive is in the range of about 10 to about 50 grams per square meter (gsm), and in one embodiment about 20 to about 35 gsm. The pressure-sensitive adhesive can be any pressure sensitive adhesive known in the art. These include rubber based adhesives, acrylic adhesives, vinyl ether adhesives, silicone adhesives, and mixtures of two or more thereof. Included are the pressure sensitive adhesive materials described in "Adhesion and Bonding", *Encyclopedia of Polymer Science and Engineering,* Vol. 1, pages 476-546, Interscience Publishers, 2nd Ed. 1985, the disclosure of which is hereby incorporated by reference. The pressure sensitive adhesive materials that are useful may contain as a major constituent an adhesive polymer such as acrylic type polymers, block copolymers, natural, reclaimed or styrene butadiene rubbers, tackified natural or synthetic rubbers, random copolymers of ethylene and vinyl acetate, ethylene-vinyl-acrylic terpolymers, polyisobutylene, poly(vinyl ether), etc. The pressure sensitive adhesive materials are typically characterized by glass transition temperatures in the range of about $-70°$ C. to about $10°$ C.

Other materials in addition to the foregoing resins may be included in the pressure sensitive adhesive materials. These include solid tackifying resins, liquid tackifiers (often referred to as plasticizers), antioxidants, fillers, pigments, waxes, etc. The adhesive materials may contain a blend of solid tackifying resins and liquid tackifying resins (or liquid plasticizers). Particularly useful adhesives are described in U.S. Pat. Nos. 5,192,612 and 5,346,766 which are incorporated herein by reference.

The pressure sensitive adhesive can be applied using standard coating techniques, such as curtain coating, gravure coating, reverse gravure coating, offset gravure coating, roller coating, brushing, knife-over roll coating, air knife coating metering rod coating, reverse roll coating, doctor knife coating, dipping, die coating, spraying, and the like. The application of these coating techniques is well known in the industry and can effectively be implemented by one skilled in the art. The knowledge and expertise of the manufacturing facility applying the coating determine the preferred method. Further information on coating methods can be found in "Modern Coating and Drying Technology", by Edward Cohen and Edgar Gutoff, VCH Publishers, Inc., 1992.

Release liners for use in the present invention may be those known in the art. In general, useful release liners include polyethylene coated papers with a commercial silicone release coating, polyethylene coated polyethylene terephthalate films with a commercial silicone release coating, or cast polypropylene films that can be embossed with a pattern or patterns while making such films, and thereafter coated with a commercial silicone release coating. A preferred release liner is kraft paper which has a coating of low density polyethylene on the front side with a silicone release coating and a coating of high density polyethylene on the back side. Other release liners known in the art are also suitable as long as they are selected for their release characteristics relative to the pressure sensitive adhesive chosen for use in the present invention. In one embodiment of the invention, the release liner has a moldable layer of polymer under the release coating, which softens upon the application of heat, allowing the non-adhesive material to be embedded into the liner. Embedding the non-adhesive material into liner maintains the three-dimensional stability of the printed pattern and protects the pattern during handling, storage and transport of the adhesive article. The moldable layer is typically a polyolefin, such as polyethylene or polypropylene. The surface of the release layer of the release liner may have a textured finish, a smooth finish, or a patterned finish. The release layer may have a randomly microstructured surface such as a matte finish, or have a pattern of three-dimensional microstructures. The microstructures may have a cross-section which is made up of circles, ovals, diamonds, squares, rectangles, triangles, polygons, lines or irregular shapes, when the cross-section is taken parallel to the surface of the release surface. The release liner may also have randomly distributed non-adhesive particulate material applied to the surface of the release surface. The non-adhesive particulate is then embedded into the release liner along with the patterned non-adhesive material.

In one embodiment, the release liner has a release coating on both sides; one side having a release coating of a higher release value than the release coating of the other side.

In one embodiment, the adhesive layer of the articles has a Sheffield roughness of at least about 10 or at least about 75, or at least about 150. The adhesive layer may itself have the roughness or may be formed when the adhesive is coated onto a release liner. It is understood that the release liner may have a Sheffield roughness at least about 10 or at least about 50, or at least about 75 or at least about 150. The adhesive will replicate the complementary texture or pattern of the release liner. Alternatively, the release liner can be much rougher depending on the configuration of the adhesive article. The Sheffield roughness is determined by TAPPI T 538 om-88.

Applicant has discovered that the addition of the non-adhesive material on the adhesive layer provides improved air egress. The non-adhesive material provides air egress along the interface. This is particularly true for the smaller bubbles which form as the natural result of laying the adhesive construction onto a substrate. Even when applied properly, small bubbles are still formed. The air in these bubbles needs a route to egress. The interface of the non-adhesive material and the substrate is the area where this occurs. When the non-adhesive material extends beyond the adhesive layer, the non-adhesive material provides repositionability and/or slideability as well as air egress. This is of particular advantage when applying adhesive articles to surfaces that are above room temperature. The amount of the non-adhesive material extending below the adhesive layer needs to be only sufficient to prevent contact of the adhesive layer with the substrate.

The invention is further described by referring to the Figures. FIG. 1*a* represents a cross section of an adhesive article 10. Article 10 has a facestock 11, which is paper or a polymeric film such as a vinyl (PVC) or polyester film. These materials are generally referred to as facestocks. The facestock is selected for the desired properties needed by the adhesive article. For instance, if the adhesive article is to be applied to a vehicle then a vinyl facestock is generally selected for its flexibility and durability. A polyurethane facestock may also be used for applications which are exposed to weathering. The face stocks can be multiple layers with the layers selected for weatherability, printability, etc. Facestock 11 is in adhesive contact with pressure sensitive adhesive 12. Adhesive 12 is in adhesive contact with non-adhesive material 13. It is understood that the non-adhesive material may extend partially into the adhesive layer but a portion, typically the majority of the non-adhesive material extends beyond the surface of the adhesive layer. The non-adhesive material is present in the form of the patterns discussed above. An example of a particularly useful pattern is a series of intersection lines in a grid pattern, which forms diamond shapes.

Figure 1B:
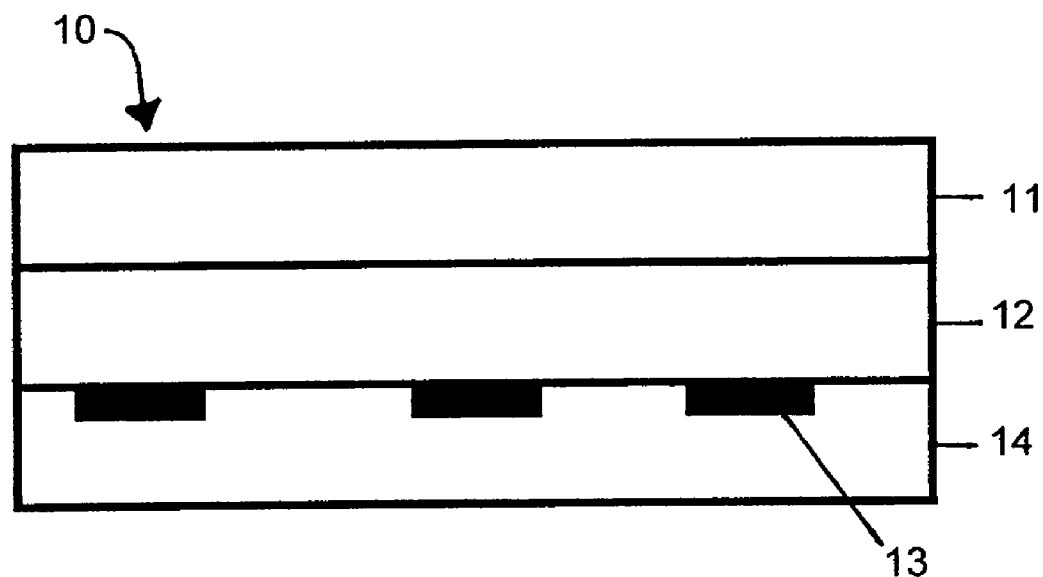

In another embodiment, the adhesive article is represented by FIG. 1b, where adhesive article 10 has the additional element of a release liner 14. The non-adhesive material 13 is embedded in the release liner. The article still has facestock 11 in adhesive contact with adhesive layer 12.

Figure 2A:
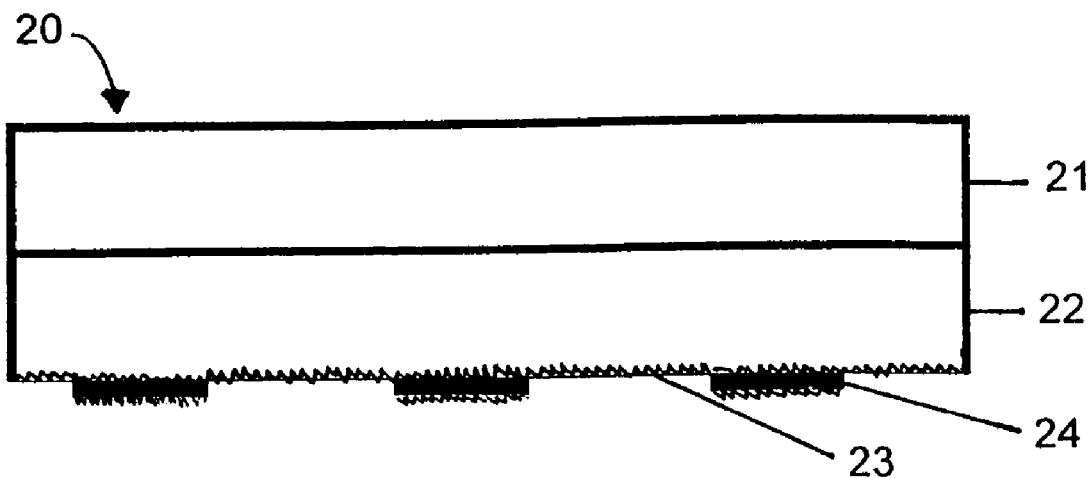
FIGS. 2a and 2b are cross sectional areas of an adhesive article with non-adhesive material on the surface and a textured finish, such as a matte finish.
Figure 2B:
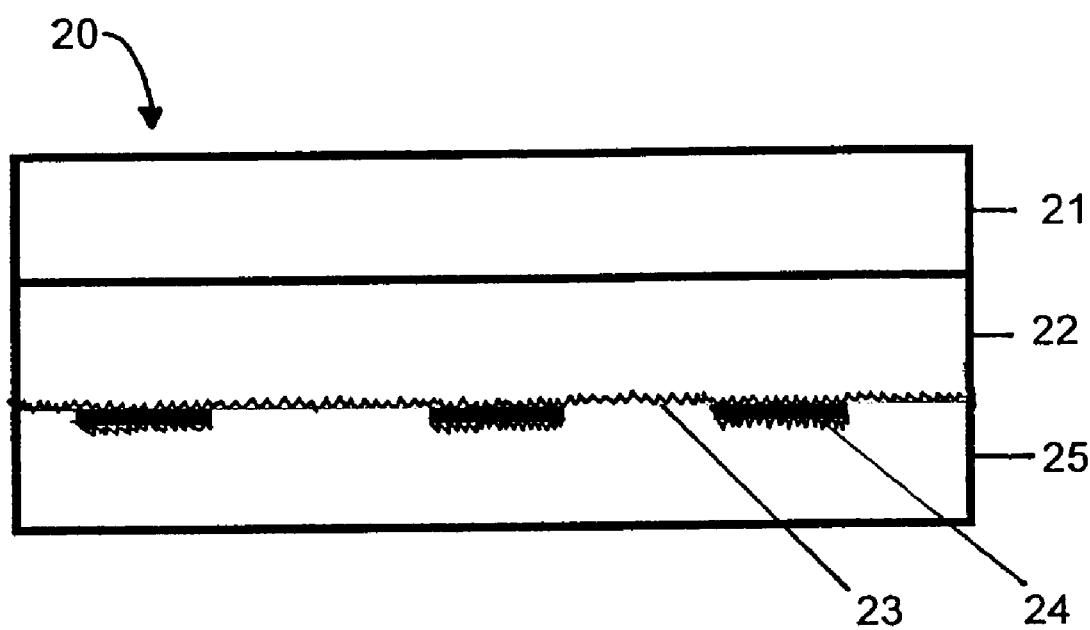

Referring to FIG. 2a, article 20 has a facestock 21, which is in adhesive contact with adhesive layer 22. The outer surface of adhesive layer 22 is in adhesive contact with a thin layer of textured non-adhesive material 24. The outer surface of the adhesive layer 23 has a texture. The texture may be a random pattern, such as a matte finish. This texture may be imparted to the adhesive and non-adhesive materials using a textured finish release liner, such as a matte finish release liner. In FIG. 2b, the adhesive article has the additional element of a textured release liner 25. The non-adhesive material 24 is embedded in the release liner. The textured surface of the release liner is in adhesive contact with the adhesive layer 22 which has a complementary textured surface 23. The adhesive layer 22 is in adhesive contact with the textured non-adhesive material 24. The article also has facestock 21, which is in adhesive contact with adhesive layer 22.

Figure 3A:
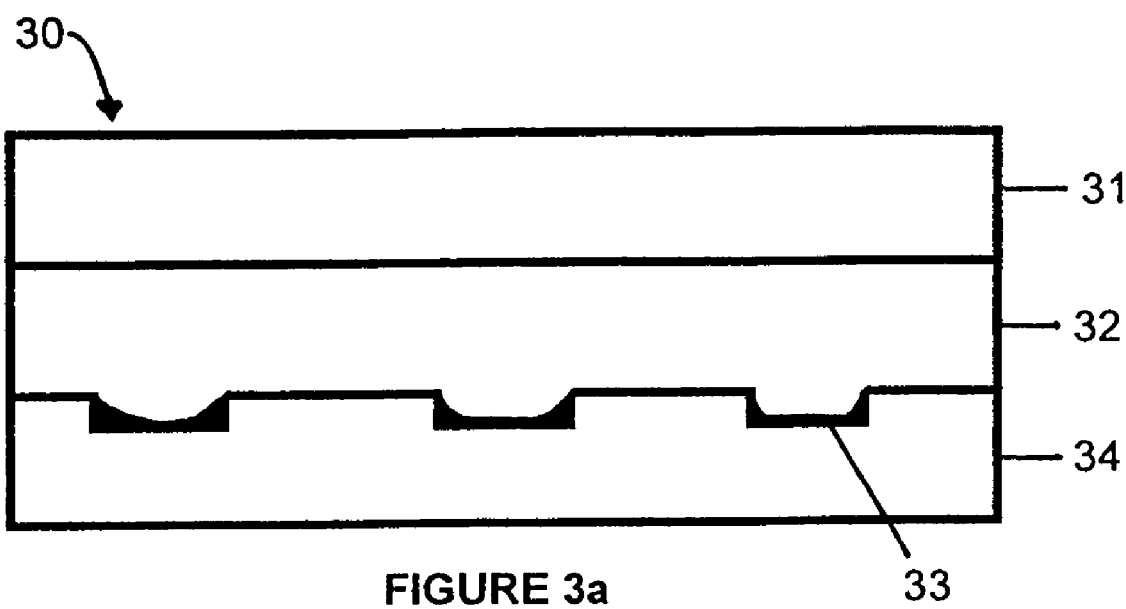
FIGS. 3a and 3b are cross sectional areas of an adhesive article with non-adhesive material on adhesive projections from the plane of the adhesive surface.
Figure 3B:
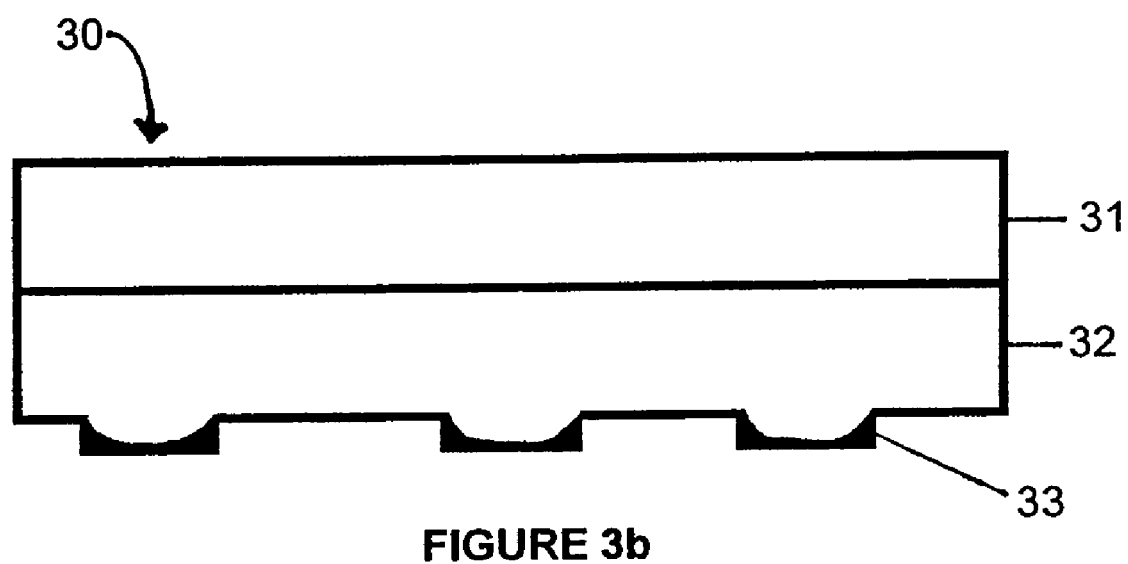

In another embodiment, illustrated in FIG. 3, an adhesive article 30 having improved air egress, repositionability, and slideability characteristics is provided by simultaneously printing and embedding a pattern of non-adhesive areas 33 into the surface of a liner 34 which contains a moldable layer under the silicone release. A pattern (such as diamonds, small dots, or combinations thereof) is printed on the release surface of a poly-coated release liner 34 using a non-adhesive that has a greater adhesion to the subsequently applied adhesive than the release liner. The pattern may be applied to the release surface by hot melt flexographic techniques. As the pattern is printed, the combination of heat and pressure provided by the raised portion of the flexographic printing roll and the heat from the printing ink cause the moldable layer under the silicone release layer to be depressed and the ink on the liner to be embedded. Other techniques that are applicable are hot stamping and using conventional flexographic printing in combination with a heated backing roll. The liner 34 is then coated with adhesive 32 and transferred to a facestock 31, such as cast or extruded vinyl. The release liner 34 is then removed to expose the raised non-adhesive pattern of non-adhesive material 33 on the surface of the adhesive 32, as illustrated in FIG. 3b.

In one embodiment of the present invention, the adhesive article is prepared by applying a non-adhesive material to the release coating of a release liner. The non-adhesive material may be fully or partially embedded into the release liner. Embedding may be carried out using pressure and/or heated rollers or a platen, whereby the non-adhesive material is pressed into the release liner. It should be noted that the release liner has a moldable layer of polymer under the release coating, which softens upon the application of heat, allowing the non-adhesive material to be embedded into the liner. The moldable layer is typically a polyolefin, such as polyethylene.

Embedding temperatures depend on the materials used, but typically are in the range of about 150° to about 300° F., or from about 200° to about 250° F. for embedding into the release liner. The embedding pressure is also material dependent and is typically between about 25 to about 150 pounds per square inch (psi), or from about 50 to about 100 psi.

Figure 4A:
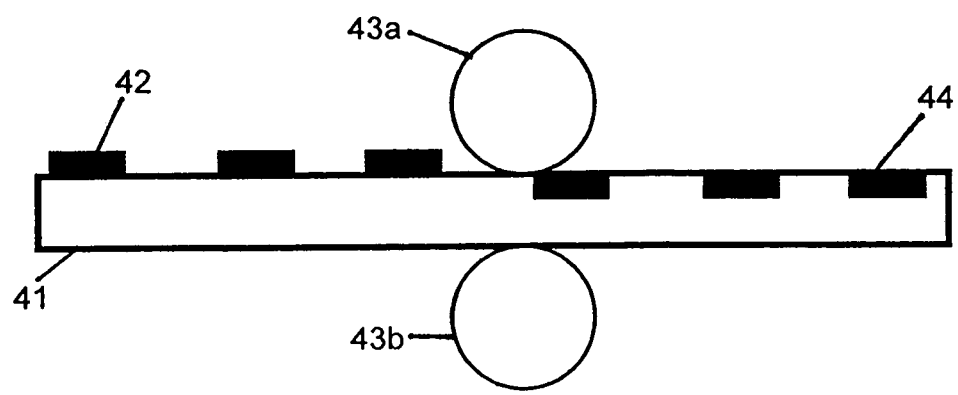
FIGS. 4a, b and c are schematics of the process of applying the non-adhesive material and embedding the non-adhesive material.
Figure 4B:
Figure 4C:
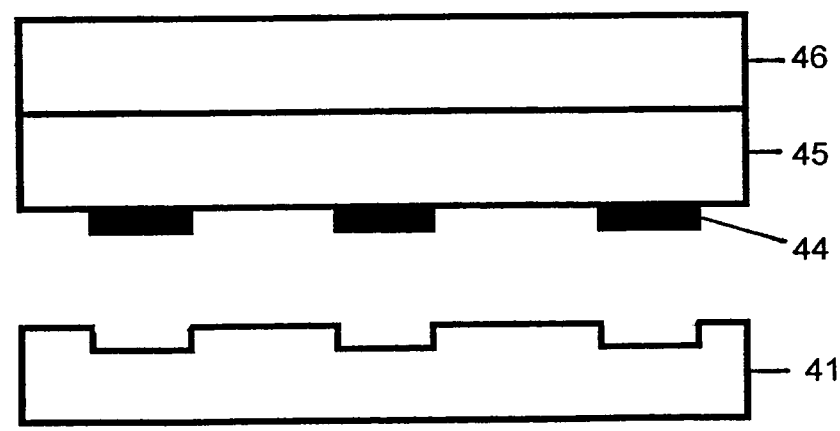

FIGS. 4a-c illustrate one embodiment of the embedding process. The embedding process uses a release liner with a moldable layer under the release surface. In one embodiment, the molding layer is composed of polyolefins, such as low, medium and high density polyethylene, propylene or mixtures thereof. The molding layer generally has a thickness of 10μ to about 50μ.

Referring to FIG. 4a, release liner 41 is printed on the release surface with non-adhesive material 42 in a pattern. The release liner is passed through laminating rollers 43a and 43b. Generally, the release liner and bottom laminating roller are heated, and the upper laminating roller is cooled. The materials selected determine the heating and cooling configurations that may be used. The laminating rollers may be steel rollers, rubber rollers or a combination. In one embodiment, a texture is applied when embedding the non-adhesive material. In this embodiment, the roller has a textured surface, such as matte finish. The roller may also have a patterned surface. A silicone rubber roller is an example of a roller which may be used to impart a texture or pattern. In FIG. 4b, after embedding the non-adhesive material 44, the release liner 41 is coated with adhesive 45 and following drying, cooling, and/or curing the adhesive, a facestock 46 is added to the construction. In FIG. 4c, the facestock 46 and the adhesive layer 45 are separated from the release liner 41. Because of the release characteristics of the release liner, the strength of the adhesive bond of the non-adhesive material 44 to the adhesive layer 45 is greater than to the release liner 41. Thus, when the release liner 41 is removed from the adhesive layer 45, the non-adhesive material 44 is adhered to the adhesive layer 45 and is removed with the adhesive layer 45.

Figure 5:
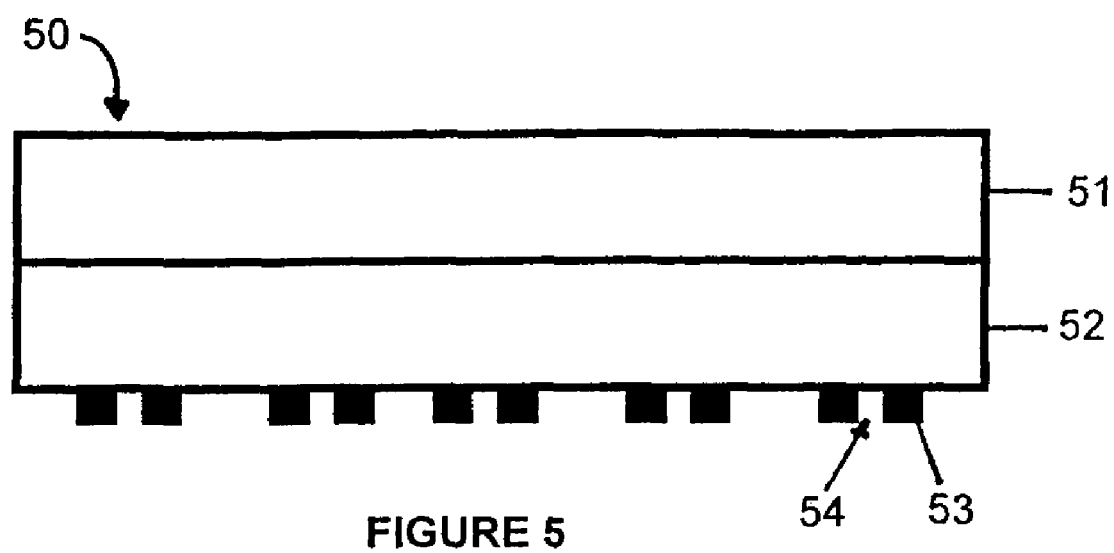
FIG. 5 is a cross sectional area of an adhesive article with a closely spaced pattern.

In another embodiment, an adhesive article having improved air egress, repositionability, and slideability characteristics is provided by printing and embedding a pattern of non-adhesive closely spaced areas into the surface of a liner which contains a moldable layer under the release. A closely spaced pattern, such as parallel diagonal lines, of non-adhesive material is printed on the surface of a poly-coated release liner. The pattern of non-adhesive material is embedded into the release liner using heat and pressure. An adhesive is then coated onto the release liner with the embedded non-adhesive pattern. The adhesive layer is then applied to a substrate, such as cast or extruded vinyl. The closely spaced pattern prevents the draping of the adhesive, providing air egress. This embodiment is illustrated by FIG. 5 where facestock 51 is in adhesive contact with adhesive layer 52. Adhesive layer 52 is in adhesive contact with non-adhesive material 53. The pattern of non-adhesive material 53 places two lines close together, typically at a distance of 5μ to about 50μ or from about 12μ to about 35μ. A 25μ distance is particularly useful. The closeness of the lines of non-adhesive material 53 prevents draping of the adhesive layer between the lines so that air gap 54 is formed. The air gap provides the air egress.

Figure 6A:
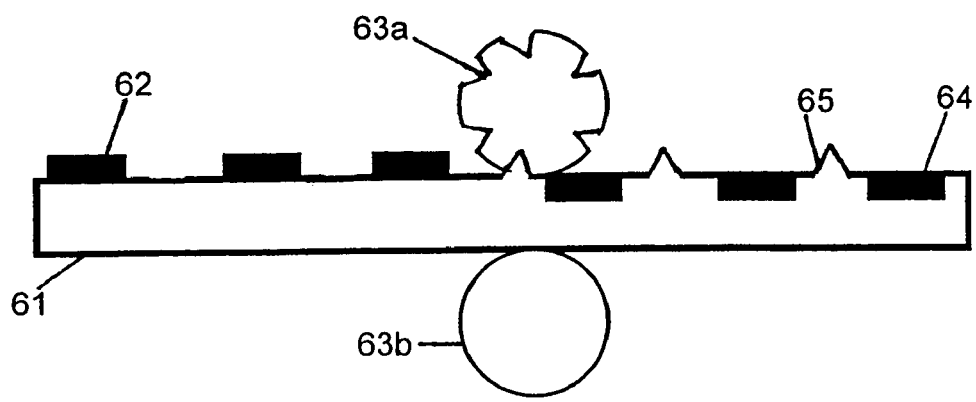
FIGS. 6a, b and c are schematics of the process of simultaneously embedding the non-adhesive material and leaving a raised pattern.
Figure 6B:
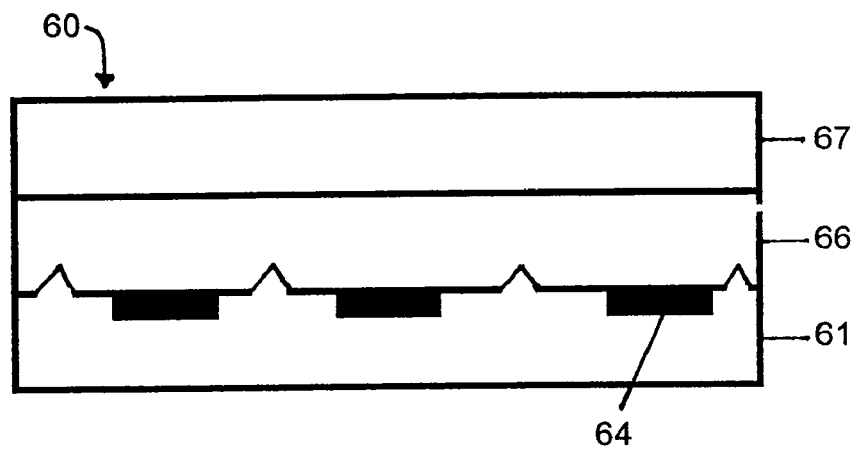
Figure 6C:
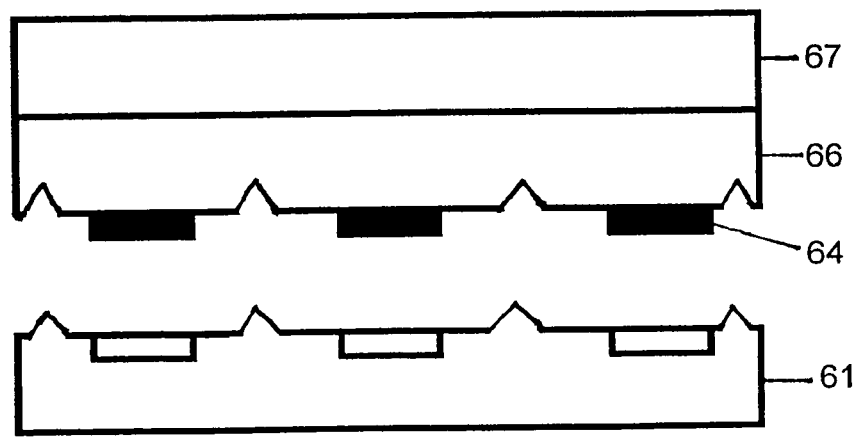

In another embodiment of the present invention the non-adhesive material is printed on the release layer of the release liner. Using heat and pressure, the raised non-adhesive material is embedded into the release liner so that the upper surface of the non-adhesive material is substantially even with the plane of the release liner. The embedding roll used to embed the non-adhesive material into the release liner contains an incised pattern so that upon the application of heat and pressure to the printed release liner, the release liner develops a raised pattern corresponding to the incised pattern of the embedding roll. The incised pattern can be a plurality of dots, lines, or any geometric figure, that provides a path for air egress from the adhesive article. The release liner is then coated with adhesive and a facestock is added to the construction. When the liner is removed from the adhesive layer, the non-adhesive material provides repositionability and slideability and the incised lines of the adhesive provide improved air egress. This embodiment is illustrated in FIGS. 6a-c. Referring to FIG. 6a, release liner 61 is printed on the release surface with non-adhesive material 62 in a pattern. The release liner is passed through laminating rollers 63a and 63b. Generally, the release liner and bottom laminating roller are heated, and the upper laminating roller is cooled. The materials selected determine the heating and cooling configurations that may be used. The laminating rollers may be steel rollers, rubber rollers or a combination. Roller 63a has an incised pattern on the surface of the roller. Using heat and pressure, the raised non-adhesive material 62 is embedded into the release liner 61 and a raised pattern 65 is formed on the surface of the release liner corresponding to the incised pattern of the roller surface of roller 63a. The release liner 61 is then coated with adhesive 66, as shown in FIG. 6b. After curing the adhesive 66, a facestock 67 is added to the construction. In FIG. 6c, the facestock 67 and the adhesive layer 66 are separated from the release liner 61. Because of the release characteristics of the release liner, the strength of the adhesive bond of the non-adhesive material to the adhesive layer is greater than to that of the liner. Thus, when the liner 61 is removed from the adhesive layer 66, the non-adhesive material 64 is adhered to the adhesive layer 66 and is removed with the adhesive layer 66.

In another embodiment, an adhesive article having improved air egress, repositionability, and slideability characteristics provided by printing and embedding a pattern of non-adhesive areas into the surface of a smoothed surfaced liner which contains a moldable layer under the release. An interconnecting pattern of non-adhesive material is applied to the smooth release surface of a polycoated release liner by, for example, vacuum metallization or printing. The release surface and non-adhesive material pattern are textured and the pattern is embedded into the release liner by passing the patterned liner through a heated laminator, with the release surface positioned against a textured roller. The patterned release liner with embedded non-adhesive material is then coated with adhesive and laminated to a facestock. Upon application to a substrate, the textured, raised, interconnecting pattern of non-adhesive material prevents initial contact of the adhesive to the substrate, providing slideability and repositionability. Air egress is enhanced by the texture at the interface of the non-adhesive material surface and the surface of the substrate. This embodiment is shown in FIG. 2a, described above.

In another embodiment, an adhesive article having improved air egress, repositionability, and slideability characteristics provided by printing and embedding a pattern of non-adhesive material into the surface of a textured liner which contains a moldable layer under the silicone release. The release surface of a polycoated release liner is textured by passing the release liner through a heated laminator with the release surface against a textured roller. Alternatively, a commercially available release liner with a matte or textured surface can be used. An interconnecting pattern of non-adhesive material is applied to the textured release surface of the release liner by, for example, vacuum metallization or by printing. The pattern of non-adhesive material is then embedded into the release liner. An adhesive is then coated onto the printed release liner, followed by the application of the adhesive to a facestock. Upon application to a substrate, the textured, raised, interconnecting pattern of non-adhesive material prevents initial contact of the adhesive to the substrate, thus providing slideability and repositionability. Air egress is enhanced by the texture at the interface of the pattern's non-adhesive surface and the surface of the substrate. This embodiment is similar to the adhesive article shown in FIG. 1a, with the exception that the exposed surface of the non-adhesive material is textured.

In another embodiment, an adhesive article having improved appearance that provides air egress, repositionability, and slideability. An extremely thin interconnecting pattern of non-adhesive material is applied to the release surface of a polycoated release liner by, for example, vacuum metallization or printing. A thicker pattern of microdots, about 25μ to 125μ in diameter, of non-adhesive material is also applied to the surface of the release liner. The patterns of non-adhesive material are embedded into the release liner using a heated laminator. The release liner is then coated with an adhesive, followed by application of the adhesive coated release liner to a facestock, such as cast or extruded vinyl. Upon removal of the release liner and application of the adhesive article to a substrate, the raised microdot pattern of non-adhesive material prevents initial contact of the adhesive to the substrate, providing slideability and repositionability. Air egress is provided by the combination of the interconnecting and microdot patterns of non-adhesive material.

In another embodiment, an adhesive article having a decorative surface texture, and providing repositionability, and slideability is made by applying a decorative pattern (i.e., tweed, pigskin, wood grain, calf leather, etc.) of a non-adhesive material to the release surface of a release liner. The patterns of non-adhesive material are embedded into the release liner using a heated laminator. The release liner is then coated with an adhesive. The adhesive coated release liner is then adhered to a facestock, such as, for example, cast or extruded vinyl. Embedding the decorative pattern into the release liner maintains the smooth surface of the facestock in the completed adhesive article. As a result, the facestock surface is much more suitable for post decoration such as by screen printing, flexographic printing, lithographic printing, gravure printing, laser printing, inkjet printing, etc. Upon removal of the release liner and application of the adhesive article to a substrate, the raised decorative pattern of non-adhesive material prevents initial contact of the adhesive to the substrate, providing slideability and repositionability. The thickness of the pattern needed to provide a decorative texture depends on the thickness and pliability of the facestock to which the adhesive layer is applied. Having a thickness of print that will cause a deformation in the facestock is what provides the resulting surface texture.

In another embodiment, an adhesive article having improved air egress, repositionability, and slideability characteristics is provided by embedding a random or non-random pattern of non-adhesive areas into the surface of a liner while simultaneously leaving a raised pattern in the moldable layer under the release. A pattern of microdots, about 25μ to 125μ in diameter, of non-adhesive material is printed onto the surface of a polycoated release liner. Alternatively, a random pattern of non-adhesive particulates, such as for example, glass beads, can be applied to the surface of the release liner. Using heat and pressure, the raised print or glass bead is pushed into the moldable layer under the silicone release layer of the release liner, so that the upper surface of the print or glass bead non-adhesive material is about on the same plane as the release layer. This is accomplished using an embedding roll with an incised pattern, such as diamonds or diagonal lines. The resulting release liner surface contains embedded print or glass bead and a raised pattern of lines. The release liner is then coated with adhesive and transferred to a facestock. Upon removal of the release liner, the raised non-adhesive areas of print or glass beads and the incised lines on the surface of the adhesive are exposed. The raised print or glass bead provides repositionability and slideability and the incised lines provide improved air egress. The non-adhesive particulate, in addition to glass, may be made of organic and inorganic particles, including but not limited to polymers, ceramics and metals. The non-adhesive particulate may be spherical, cubic, irregularly shaped, solid, porous, hollow, elastic or inelastic.

In another embodiment, an adhesive article having air egress, repositionability, and slideability characteristics is provided by printing a pattern of non-adhesive microdots, lines or a combination onto the surface of a liner using a print material that ink will coalesce or retract into very small droplets or narrow lines with an increase in height. A pattern of non-adhesive material is printed onto the surface of a release liner. The non-adhesive material coalesces or retracts into very small droplets or narrow lines with an increase in height. Using heat and pressure, the non-adhesive material is embedded into the release liner so that the top of non-adhesive material is about on the same plane as the silicone release layer. An adhesive is applied over the release liner. The adhesive coated release liner is then transferred to a facestock. Upon removal of the release liner, the non-adhesive areas of print are exposed. When applied to a substrate, the small, raised droplets provide air spaces between the droplets to aid in air egress. The small raised droplets of non-adhesive material also provide repositionability and slideability.

Another embodiment of the method of making the adhesive articles of the present invention includes the steps of: (a) applying a pattern of a non-adhesive material onto a release liner; (b) embedding the non-adhesive material into the release liner; (c) coating a pressure sensitive adhesive onto the release layer of the release liner; and (d) applying an additional release liner with a higher or lower release to the adhesive layer. The additional release liner may be omitted if the initial release liner has a release means on both surfaces. In this case, a pattern of a non-adhesive material may be applied to and embedded into one or both release surfaces of the initial release liner. These embodiments are commonly known as transfer adhesives or adhesive sandwiches.

Another embodiment of the method of making the adhesive articles of the present invention includes the steps of: (a) applying a pattern of a non-adhesive material onto one or both sides of a release liner that has a release coating on both sides with the release of one side being higher than the other; (b) embedding the non-adhesive material into one or both sides of the release liner; (c) coating a pressure sensitive adhesive onto both sides of the release liner; and (d) applying a facestock having a front and back surface to the first adhesive layer, with the front surface of the facestock adhered to the outer surface of the first adhesive layer, and winding the material so that the outer surface of the second adhesive layer is in adhesive contact with the back surface of the facestock. The embedding and applying steps may be combined. This embodiment is commonly known as a double faced adhesive tape.

While the invention has been explained in relation to its preferred embodiments, it is to be understood that various modifications thereof will become apparent to those skilled in the art upon reading the specification. The features of the various embodiments of the adhesive articles described herein may be combined into within an adhesive article. The various methods of manufacturing the adhesive articles of the present invention described herein may also be combined. Therefore, it is to be understood that the invention disclosed herein is intended to cover such modifications as fall within the scope of the appended claims.

The invention claimed is:

1. A method of making an adhesive article comprising the steps of:
   providing a release liner comprising a moldable polyolefin layer, a release surface and a back surface, the release surface having an embossed pattern of three-dimensional microstructures thereon;
   printing a pattern of non-adhesive ink on to the release surface of the release liner by applying heat to soften the release liner and pressing the non-adhesive ink into the softened release liner;
   embedding the non-adhesive ink into the release liner while retaining the pattern of three-dimensional microstructure of the release surface; and
   transferring an adhesive layer having a front and back surface and end edges onto the release liner, wherein the front surface of the adhesive layer is adhered to the release surface of the release liner.

2. The method of claim 1 further comprising applying a facestock to the back surface of the adhesive layer.

3. The method of claim 1 wherein the adhesive layer has a facestock adhered to the its back surface.

4. The method of claim 1 wherein the pattern of ink comprises a plurality of dots, lines or combinations thereof.

5. The method of claim 1 wherein the pattern of ink comprises a plurality of closely spaced parallel lines.

6. The method of claim 1 wherein the printing step comprises flexographic printing.

7. The method of claim 1 wherein the printing step comprises gravure printing.

8. The method of claim 1 wherein the release surface of the release liner has a Sheffield roughness of greater than about 50.

9. The method of claim 1 wherein the release surface of the release liner has a matte finish.

10. The method of claim 1 wherein the printing step and the embedding step occur simultaneously.

11. The method of claim 1 wherein the embedding step comprises applying heat and pressure to the non-adhesive material and the release liner with a textured roller.

12. The method of claim 1 wherein the non-adhesive ink comprises a UV curable ink.

13. The method of claim 1 wherein the non-adhesive ink comprises coalescing ink.

14. The method of claim 1 wherein the non-adhesive ink comprises a porous non-adhesive ink.

15. The method of claim 14 wherein the porous non-adhesive ink comprises an elastomer.

16. The method of claim 1 further comprising applying randomly distributed non-adhesive particulate material onto the release surface of the release liner prior to the embedding step.

17. The method of claim 1 further comprising applying a second pattern of non-adhesive material to the release surface of the release liner, wherein said second pattern of non-adhesive material has a thickness greater than that of the first pattern of non-adhesive ink.

18. The method of claim 1 wherein said adhesive is a pressure sensitive adhesive.

19. The method of claim 1 wherein said adhesive is a heat-activated adhesive.

20. The method of claim 1 wherein the pattern of ink comprises a plurality of lines, wherein at least 50% of the lines intersect the end edges of the adhesive layer.

21. The method of claim 1 further comprising applying a second release liner to the back surface of the adhesive layer.

22. The method of claim 1 wherein the back surface of the release liner has a release coating thereon.

23. The method of claim 22 further comprising applying a second adhesive layer to the back surface of said release liner, said front surface of said second adhesive layer in contact with the back surface of the release liner.

24. The method of claim 23 further comprising applying a facestock to the back surface of one of said adhesive layers.

25. The method of claim 23 wherein said second adhesive layer has a facestock adhered to its back surface.

26. The method of claim 1 wherein the embossed pattern of microstructures is selected from circles, ovals, diamonds, squares, rectangles, triangles, polygons, lines and irregular shapes.

27. A method of making an adhesive article comprising the steps of:
providing a release liner comprising a moldable polyolefin layer, a release surface and a back surface;
printing a pattern of non-adhesive ink on to the release surface of the release liner;
embedding the non-adhesive ink into the release liner by applying heat and pressure to the non-adhesive ink and the release liner using a roller or platen having an incised pattern in its surface such that the roller or platen concurrently embeds the non-adhesive ink into the release liner and develops a raised pattern corresponding to the incised pattern on the release liner; and
transferring an adhesive layer having a front and back surface and end edges onto the release liner, wherein the front surface of the adhesive layer is adhered to the release surface of the release liner.

28. The method of claim 27 further comprising applying a facestock to the back surface of the adhesive layer.

29. The method of claim 27 wherein the adhesive layer has a facestock adhered to the its back surface.

30. The method of claim 27 wherein the pattern of ink comprises a plurality of dots, lines or combinations thereof.

31. The method of claim 27 wherein the pattern of ink comprises a plurality of closely spaced parallel lines.

32. The method of claim 27 wherein the printing step comprises flexographic printing.

33. The method of claim 27 wherein the printing step comprises gravure printing.

34. The method of claim 27 wherein the release surface of the release liner has a Sheffield roughness of greater than about 50.

35. The method of claim 27 wherein the release surface of the release liner has a matte finish.

36. The method of claim 27 wherein the non-adhesive ink comprises a UV curable ink.

37. The method of claim 27 wherein the non-adhesive ink comprises coalescing ink.

38. The method of claim 27 wherein the non-adhesive ink comprises a porous non-adhesive ink.

39. The method of claim 38 wherein the porous non-adhesive ink comprises an elastomer.

40. The method of claim 27 further comprising applying randomly distributed non-adhesive particulate material onto the release surface of the release liner prior to the embedding step.

41. The method of claim 27 further comprising applying a second pattern of non-adhesive material to the release surface of the release liner, wherein said second pattern of non-adhesive material has a thickness greater than that of the first pattern of non-adhesive ink.

42. The method of claim 27 wherein said adhesive is a pressure sensitive adhesive.

43. The method of claim 27 wherein said adhesive is a heat-activated adhesive.

44. The method of claim 27 wherein the pattern of ink comprises a plurality of lines, wherein at least 50% of the lines intersect the end edges of the adhesive layer.

45. The method of claim 27 wherein the incised pattern is selected from a plurality of dots, lines, diamonds and any geometric figure such that the roller or platen concurrently embeds the non-adhesive ink into the release liner and provides the front surface of the adhesive layer with.

* * * * *

UNITED STATES PATENT AND TRADEMARK OFFICE
CERTIFICATE OF CORRECTION

PATENT NO.         : 7,344,618 B2                     Page 1 of 1
APPLICATION NO. : 10/953998
DATED                  : March 18, 2008
INVENTOR(S)         : Hannington et al.

It is certified that error appears in the above-identified patent and that said Letters Patent is hereby corrected as shown below:

Column 14, lines 24-29, replace "by applying heat to soften the release liner and pressing the non-adhesive ink into the softened release liner; embedding the non-adhesive ink into the release liner while retaining the pattern of three-dimensional microstructure of the release surface" with --; embedding the non-adhesive ink into the release liner by applying heat to soften the release liner and pressing the non-adhesive ink into the softened release liner--.

Column 15, line 41, replace "developes" with --develops--.

Column 16, lines 44-46, delete "such that the roller or platen concurrently embeds the non-adhesive ink into the release liner and provides the front surface of the adhesive layer with".

Signed and Sealed this

Seventh Day of April, 2009

JOHN DOLL
*Acting Director of the United States Patent and Trademark Office*